(12) United States Patent
Liu et al.

(10) Patent No.: US 10,768,940 B2
(45) Date of Patent: Sep. 8, 2020

(54) RESTORING A PROCESSING UNIT THAT HAS BECOME HUNG DURING EXECUTION OF AN OPTION ROM

(71) Applicant: Lenovo Enterprise Solutions (Singapore) Pte. Ltd., Singapore (SG)

(72) Inventors: Zhijun Liu, Shanghai (CN); Yun Yun Lou, Shanghai (CN); Xuefeng Sun, Shanghai (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/130,037

(22) Filed: Sep. 13, 2018

(65) Prior Publication Data

US 2019/0243658 A1 Aug. 8, 2019

(30) Foreign Application Priority Data

Feb. 8, 2018 (CN) .......................... 2018 1 0128275

(51) Int. Cl.
*G06F 9/4401* (2018.01)
*G06F 11/07* (2006.01)
*G06F 11/14* (2006.01)
*G06F 1/24* (2006.01)

(52) U.S. Cl.
CPC ............ *G06F 9/4401* (2013.01); *G06F 11/07* (2013.01); *G06F 11/0793* (2013.01); *G06F 11/1417* (2013.01); *G06F 1/24* (2013.01)

(58) Field of Classification Search
CPC ...... G06F 9/4401; G06F 9/4411; G06F 11/07; G06F 11/0793; G06F 11/1417; G06F 1/24
See application file for complete search history.

(56) References Cited

U.S. PATENT DOCUMENTS

| 5,881,282 | A  | * | 3/1999  | Shipman  | G06F 11/0793 710/104 |
| 7,219,257 | B1 | * | 5/2007  | Mahmoud  | G06F 11/1417 714/6.12 |
| 2008/0005551 | A1 | * | 1/2008  | Swanson  | G06F 9/4411 713/2 |
| 2009/0070574 | A1 | * | 3/2009  | Rothman  | G06F 11/0748 713/2 |
| 2009/0327682 | A1 | * | 12/2009 | Liu      | G06F 9/4411 713/2 |

(Continued)

*Primary Examiner* — Glenn A. Auve
(74) *Attorney, Agent, or Firm* — Jeffrey Streets

(57) ABSTRACT

A computing device includes an accessory containing an option ROM, a first processor adapted to boot the computing device and to execute the option ROM, and a second processor adapted to be activated by the first processor to monitor execution of the option ROM by the first processor. The second processor is adapted to restore the first processor to a state prior to execution of the option ROM in response to the first processor becoming hung during execution of the option ROM. A computer program product includes program instructions executable by a processor to monitor execution of the option ROM by a first processor of a computing device, determine whether the first processor has become hung during execution of the option ROM, and restore the first processor to an execution environment that the first processor had prior to execution of the option ROM.

18 Claims, 2 Drawing Sheets

(56) References Cited

U.S. PATENT DOCUMENTS

| | | | |
|---|---|---|---|
| 2010/0070705 A1* | 3/2010 | Samuelraj | G06F 11/0727 711/114 |
| 2014/0237226 A1* | 8/2014 | Berlin | G06F 21/51 713/2 |
| 2016/0378602 A1* | 12/2016 | Herzi | G06F 9/4408 714/2 |
| 2019/0095222 A1* | 3/2019 | Itkin | G06F 9/4411 |

* cited by examiner

*FIG. 1*
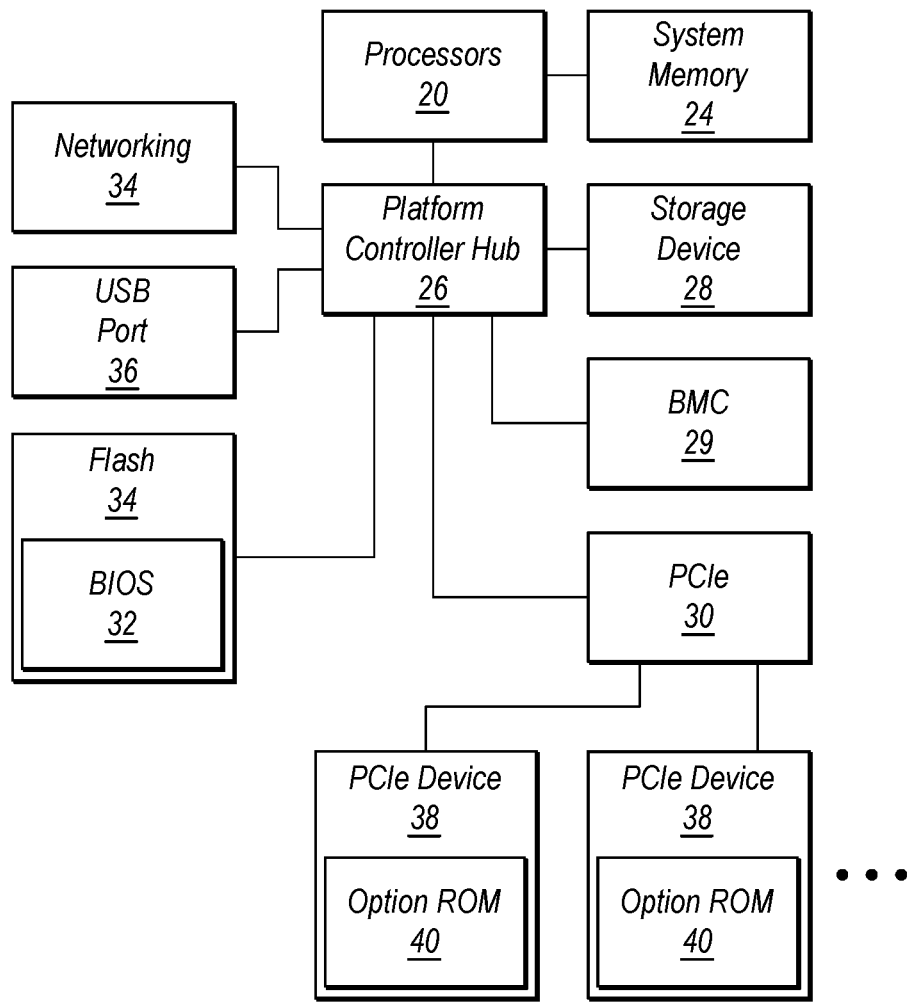
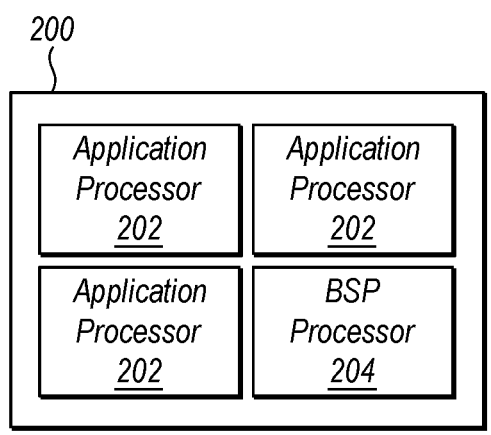
*FIG. 2*

RESTORING A PROCESSING UNIT THAT HAS BECOME HUNG DURING EXECUTION OF AN OPTION ROM

CROSS-REFERENCE TO RELATED APPLICATIONS

This application claims priority under 35 U.S.C. § 119 to Chinese Patent Application No. 201810128275.1 filed Feb. 8, 2018, the entire text of which is specifically incorporated by reference herein.

BACKGROUND

The present disclosure relates to a computing device having multiple processors and an accessory with an option ROM, and a method of restoring a processor that has become hung during execution of the option ROM.

BACKGROUND OF THE RELATED ART

Modern servers in computer networks support various accessories or peripheral devices to connect to the server so that functionality of the server can be enhanced by these accessories. Examples of the accessories include virtual adapters, host bus adapters, and network adapters. Such accessories can be connected to the processor and other components of the server through a bus of the server. One such bus is a serial computer expansion bus, such as a Peripheral Component Interconnect Express (PCIe) bus. Quite often, an accessory may have been made by a manufacturer different from the manufacturer of the server. Furthermore, the accessory may be removably plugged into the motherboard of the server or connected to an input/output (I/O) port provided on the server.

When a server includes an accessory that was made by a third party vendor rather than the server manufacturer, there is a potential risk that an option ROM (Read-Only Memory) carried on the accessory may cause the system firmware of the server to hang during the booting process. The option ROM on an accessory typically consists of firmware that is called by the server system firmware. However, since the option ROM is made by the third party vendor, any incompatibility issue between the option ROM and the system firmware may cause the system firmware to hang during the execution of the option ROM.

Conventionally, when the system firmware hangs during the booting process, one method for diagnosing the problem is to manually remove all of the accessories from the server at once, and then add them back to the server one by one in order to figure out which particular accessory caused the system firmware to hang. Such diagnostic method can take a long amount of time and interrupts the normal operating hours of the server. Alternatively, a log can be saved during the system booting process so that, if the system firmware hangs, the log can be checked later to figure out which particular accessory caused the system firmware to hang. However, these approaches do not eliminate the chance of the system firmware hanging. Even if the problematic accessory is identified, these approaches still require that the user physically remove the accessory from the server which requires manual intervention. If the problematic accessory is an onboard device, it may be even harder to remove the accessory from the server.

BRIEF SUMMARY

One embodiment provides a computing device comprising an accessory containing an option ROM, a first processing unit adapted to boot the computing device and to execute the option ROM, and a second processing unit adapted to be activated by the first processing unit to monitor execution of the option ROM by the first processing unit. The second processing unit is adapted to restore the first processing unit to a state prior to execution of the option ROM in response to the first processing unit becoming hung during execution of the option ROM.

Another embodiment provides a computer program product comprising non-transitory computer readable storage media having program instructions embodied therewith. The program instructions are executable by a processor to monitor execution of the option ROM by a first processor of a computing device, wherein the option ROM is included in an accessory coupled to the computing device. The program instructions are further executable by the processor to determine whether the first processor has become hung during execution of the option ROM, and restore the first processor to an execution environment that the first processor had prior to execution of the option ROM.

BRIEF DESCRIPTION OF THE SEVERAL VIEWS OF THE DRAWINGS

FIG. 1 is a block diagram of a computing device according to one embodiment.

FIG. 2 is a block diagram of a processor system of a computing device according to another embodiment.

DETAILED DESCRIPTION

Figure 3:
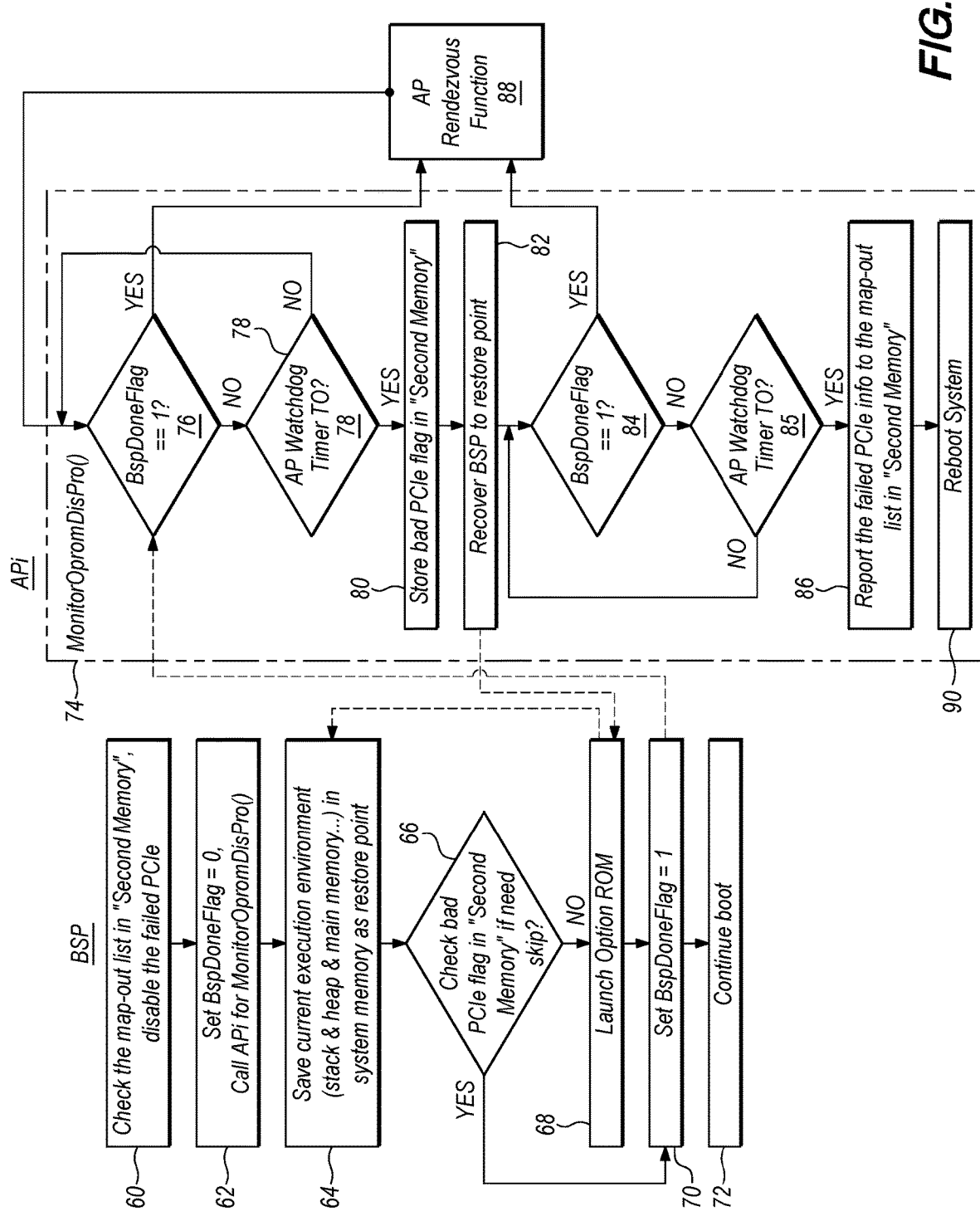
FIG. 3 is a flowchart of a method of executing an option ROM of an accessory according to a further embodiment.

One embodiment provides a method of executing an option ROM of an accessory in a computing device. The method comprises loading a firmware interface by a first processing unit of the computing device, activating a second processing unit of the computing device to monitor execution of the option ROM, and executing the option ROM by the first processing unit. If the option ROM fails to be executed, then the second processing unit recovers the first processing unit to a state prior to executing the option ROM. If the option ROM is successfully executed, then the second processing unit stops monitoring the execution of the option ROM.

The method may further comprise saving an execution environment of the first processing unit into a first memory of the computing device before executing the option ROM. The first memory is preferably system memory of the computing device. In one option, the second processing unit recovers the first processing unit by restoring the first processing unit to the execution environment saved in the first memory. In a further option, the method may comprise storing information about the accessory into a second memory of the computing device. For example, the information about the accessory may be a flag or bit indicating whether or not the option ROM of the accessory will execute successfully. The second memory is preferably a memory module of the computing device, such as a Non-Volatile Random-Access Memory (NVRAM) module of the computing device. In one implementation, the module may be separate from a motherboard of the computing device and may replace one or more functions of the motherboard. In another implementation, the second memory may be part of an Integrated Management Module (IMM).

In a further embodiment, the method may reboot the computing device after storing the information about the accessory into the second memory. The method may then boot the computing device without execution of the option ROM. For example, the method may determine to skip execution of the option ROM based on the information previously stored in the second memory. In one variation, the method may disable the accessory based upon the information stored in the second memory. In such variation, the accessory is preferably disabled prior to activating the second processing unit of the computing device to monitor execution of the option ROM.

In various embodiments, the computing device may contain a multicore microprocessor, where the first processing unit and the second processing unit are two of the multiple cores of the microprocessor. In other embodiments, the computing device may contain multiple microprocessors, where the first processing unit and the second processing unit are two of the multiple microprocessors. In either embodiment, the first processing unit and the second processing unit may support Intel Architecture (IA). In one specific implementation, the first processing unit may be a Boot Strap Processor (BSP), and the second processing unit may be an Application Processor (AP). In another specific implementation, the firmware interface may be a Unified Extensible Firmware Interface (UEFI).

Another embodiment provides a computing device including an accessory containing an option ROM. The computing device further includes a first processing unit adapted to load a firmware interface and a second processing unit adapted to be activated by the first processing unit to monitor execution of the option ROM. The first processing unit is adapted to execute the option ROM. If the option ROM fails to be executed, the second processing unit is adapted to recover the first processing unit to a state of the first processing unit prior to execution of the option ROM. If the option ROM is successfully executed by the first processing unit, then the second processing unit is adapted to stop monitoring the execution of the option ROM.

The first processing unit may be further adapted to save an execution environment of the first processing unit into a first memory of the computing device before executing the option ROM. The first memory is preferably system memory of the computing device.

The second processing unit may be further adapted to store information about the accessory into a second memory of the computing device, and to restore the first processing unit to the execution environment previously saved in the first memory. The second memory may be any memory available to the computing device that will not lose the information when the computing device is rebooting or resetting, such as a region of a non-volatile dual in-line memory module (NVDIMM), USB flash storage disk, the flash/NVRAM that stores the UEFI, memory coupled to the BMC/IMM module, or a combination thereof. If the second memory is a region of an NVDIMM, it is preferably not accessible to the operating system. In one implementation, the module may be separate from a motherboard of the computing device and may replace one or more functions of the motherboard. The second memory may be part of the Baseboard Management Controller (BMC) or Integrated Management Module (IMM) since these modules retain power when the computing device is turned off or rebooted.

In a further embodiment, the first processing unit is adapted to continue booting of the computing device after it is restored to the execution environment previously saved in the first memory, where the booting process skips execution of the option ROM based on the information stored in the second memory. For example, in a computing device with multiple accessories that each have an option ROM, the information stored in the second memory may identify the one or more option ROM that should be skipped (i.e., not executed) during the booting of the computing device.

In a further embodiment, the second processing unit may reboot the computing device after storing the information about the accessory into the second memory. The first processing unit may then boot the computing device without execution of the option ROM. For example, the first processing unit may determine to skip execution of the option ROM based on the information previously stored in the second memory. In one variation, the first processing unit may disable the accessory based upon the information stored in the second memory. In such variation, the accessory is preferably disabled prior to activating the second processing unit of the computing device.

In various embodiments, the computing device may contain a multicore microprocessor, where the first processing unit and the second processing unit are two of the multiple cores of the microprocessor. In other embodiments, the computing device may contain multiple microprocessors, where the first processing unit and the second processing unit are two of the multiple microprocessors. In either embodiment, the first processing unit and the second processing unit may support Intel Architecture (IA). In one specific implementation, the first processing unit may be a Boot Strap Processor (BSP), and the second processing unit may be an Application Processor (AP). In another specific implementation, the firmware interface may be a Unified Extensible Firmware Interface (UEFI).

FIG. 1 is a block diagram of a computing device according to one embodiment. The computing device includes processors 20, which may include any one or more type of processors capable of executing software and/or process data signals. The processors 20 may be coupled to system memory 24 via a memory path for storage of instructions and data and/or for storage of graphics commands, data and textures, without limitation. The processors 20 may be coupled to one or more accessories 38 via PCIe ports coupled to a PCIe interconnect 30. The system memory 24 may be a hard disk, a floppy disk, random-access memory (RAM), read only memory (ROM), flash memory, or any other type of medium that is readable by the processors 20. Random-access memory (RAM) may further include Non-volatile random-access memory (NVRAM), and/or dynamic random-access memory (DRAM) and static random-access memory (SRAM).

The processors 20 may refer to more than one processor in the computing device, or one or more processors which may include multiple threads, multiple cores, or the like. Embodiments of the computing device are not limited to computer systems or data processing systems such as servers, but may include devices having any form factor that uses unified extensible firmware interface (UEFI) Basic Input/Output System (BIOS), such as handheld devices and embedded devices or applications. Some non-limiting examples of handheld devices include mobile phones, tablet computers, Internet Protocol devices, digital cameras, personal digital assistants (PDAs), or handheld PCs such as netbook or notebook. Embedded applications can include a micro controller, digital signal processor (DSP), system on a chip, network computers (NetPC), set-top boxes, network hubs, wide area network (WAN) switches, or any other system.

The processors 20 may be coupled to a system logic chip, such as a platform controller hub (PCH) 26. In one embodiment, the PCH 26 may provide connections to one or more I/O devices, for example via a local I/O interconnect. In one embodiment, the local I/O interconnect may be a high-speed I/O bus, such as peripheral component interconnect (PCI) Express bus 30. The PCH 26 may direct data signals or other information between the processors 20 and one or more other components in the computing device and bridge the data signals or information between the processors 20 and the system I/O.

Some examples of the one or more components include a data storage device 28, one or more PCIe port, network adapter or controller 34, and a USB port 36. In one embodiment, the data storage device 28 may include a hard disk drive, a floppy disk drive, a CD-ROM device, a flash memory device, or other mass storage device. Although FIG. 1 shows some examples of the components, PCH 26 may provide connections to other components, such as an audio I/O device, a keyboard, a mouse or other pointing device, and other integrated I/O components, such as integrated driver electronics (IDE), local area network (LAN) and other serial expansion port, wireless transceiver, legacy I/O controller or the like.

The computing device of FIG. 1 may further include non-volatile memory, such as flash memory 34, which may be coupled to PCH 26 via a low pin count (LPC) bus. BIOS firmware 32 may reside in the flash memory 34 and boot up may execute instructions from the flash memory, or other firmware. Although FIG. 1 illustrates BIOS firmware 32 in the flash memory 34, in some embodiments BIOS firmware 32 may be stored in other non-volatile memory such as a firmware hub, or the like. In an embodiment, the BIOS firmware 32 may be implemented by Unified Extensible Firmware Interface (UEFI) firmware or any other firmware interface between the operating system and the hardware of the computing device.

One or more accessories 38 may be connected to the PCIe interconnect 30, and any of the accessories 38 may be internal to the computing device or externally connected to the computing device. In the case that an accessory 38 is internal to the computing device, the accessory may be either embedded on-board of the motherboard of the computing device, or removably installed in a PCIe slot available on the motherboard. In the case that an accessory 38 is external to computing device, the accessory may be a standalone device positioned outside of the casing of the computing device, yet connected to the PCIe interconnect 30 via a port provided by the motherboard. The one or more accessories 38 may each contain an option ROM 40 which is a firmware run by the system BIOS of the computing device during platform initialization. The option ROM 40 is provided by the manufacturer of the accessory, which may not be the same manufacturer that made the computing device.

The embodiment of the computing device shown in FIG. 1 also includes a Baseboard Management Controller (BMC) 29, which is a specialized microcontroller embedded on the motherboard of the computing device to manage the interface between the system management software and the platform hardware. The BMC 29 is a component that is normally included in a server-class computer to implement the Intelligent Platform Management Interface (IPMI) specification protocol. In one embodiment, the BMC 29 may be replaced by an Integrated Management Module (IMM) which consolidates service processor functionality provided by the combination of the BMC and a Remote Supervisor Adapter (RSA) on the motherboard of the computing device. The IMM may be separate from the motherboard of the computing device and may replace one or more functions of the motherboard.

Although FIG. 1 illustrates a computing device, embodiments may be used in any other hardware and software architecture, such as a platform using a plurality of processor cores or a platform using a processor or a coprocessor, a platform using I/O hubs, or memory controller embedded within the processors, or the like.

FIG. 2 is a block diagram of a processor system 200 of a computing device according to an embodiment. The processor system 200 includes one or more logical processors 202 and a bootstrap processor (BSP) 204. Optionally, one or more of the logical processors 202 may be an application processor (AP) 202. The BSP 204 and the AP 202 may, for example, be supported in Intel® Architecture (IA). The APs 202 and the BSP 204 may execute firmware. In another embodiment, the processors may be designated as AP or BSP randomly in response to power on. In a further embodiment, the firmware may be implemented in a BIOS environment, such as a UEFI environment or any other operating system (OS) absent application environment. While FIG. 2 illustrates four processor cores, some embodiments of the system 200 may include a different number of processor cores. Furthermore, while FIG. 2 illustrates APs 202 and BSP 204, embodiments may include a system with any other processor cores.

FIG. 3 is a flowchart of a method of executing an option ROM of a third-party accessory according to a further embodiment. Optionally, the method of executing an option ROM of a third-party accessory may be performed in a computing device which contains at least a BSP and an AP, as well as an IMM, all of which are similar to those described above with reference to FIGS. 1 and 2. The BSP is responsible for executing the UEFI's boot-strap code to configure the multiple-processor environment, sets up system-wide data structures, and starts and initializes the AP(s). When the BSP and the AP(s) have been initialized, the BSP then begins executing the operating-system initialization code. The BSP in this embodiment is also referred as a first processing unit of the computing device.

The method described in reference to FIG. 3 is a part of the booting process of the computing device, and may be carried out at any point during the booting process after the BSP has been initialized, at least one AP has been initialized, and the UEFI has been loaded. FIG. 3 organizes steps taken by the BSP in the left-hand column and steps taken by an AP in the right-hand column. For a computing device having multiple APs, the APs may be referenced as $AP_i$, where the lowercase "i" is an integer number of a particular AP. For example, FIG. 2 illustrates a computing device having a BSP processor and three Application Processors 202 (APs), such that the individual APs may referred to as $AP_1$, $AP_2$ and $AP_3$.

In step 60, which is performed before executing an option ROM of a peripheral device or accessory such as a PCIe device, the BSP checks the second memory to determine whether there is any map-out list identifying bad option ROM(s) of one or more accessory of the computing device. The bad option ROM is an option ROM that cannot be successfully executed by the system UEFI BIOS and has previously caused the system to hang. In step 60, the BSP will fetch out any such map-out list from the second memory, disable the bad accessory(s), and skip execution of any option ROM of the bad peripheral devise(s).

Next, in Step 62 the BSP calls an application programming interface (API) 74 which is then executed by one of the APs (i.e., any of the $AP_i$), not the BSP. In this example, the API 74 is referred to as "MonitorOpromDisPro( )". The AP, as described above, is an independent physical process or a processor core that is independent from the BSP, wherein the operation of the AP is not interfered with by the status of the BSP. The AP is also referred to herein as a second processing unit of the computing device. The work flow of the API 74 will be described in more detail later. However, it should be noted that the process of the BSP will continue independent of the process of the API 74 by the AP, unless the process of the BSP is interrupted by the AP in the form of a BSP restoration or a system reset, as will also be described in more details later. Furthermore, each AP may be in step 88 prior to being called by the BSP in step 62. At the point of step 62, the information, such as a flag, stored in the system memory about each accessory having an option ROM should be set to a value of false (i.e., logical "0") indicating that none of the accessories has yet been either successfully executed or skipped during the current boot process.

The BSP will continue, from step 62 to save the current execution environment of the computing device (e.g. stack & heap & main memory . . . ) as a restore point in the system memory in step 64. The restore point is saved in the system memory, which can be accessed by both the BSP and the AP(s). The BSP will save the restore point in step 64 before the BSP attempts to run an option ROM. In step 64, the BSP also passes the restore point (memory address where it has the restore data) to the AP that is running the API.

Next, in step 66, which step is still performed before executing the option ROM, the BSP reads the second memory, such as an NVRAM region of the system memory or memory of the IMM, to check (determine) whether the second memory stores any information about an accessory indicating that the option ROM of that accessory cannot be successfully executed by the system BIOS. If the result of the check is that there is no such information about the accessory stored in the second memory (see "No" branch from step 66), then the BSP continues the normal execution of the option ROM of the accessory in step 68. If the option ROM is executed successfully, then the method goes to step 70 in which the BSP sets a flag (i.e., BspDoneFlag), which is associated with the accessory, with a value of true (e.g. logical "1") in the system memory (first memory) indicting that the execution of the option ROM has been completed for the accessory. The flag can be accessed in system memory by both the BSP and the AP. However, if the result of the check in step 66 is that there is indeed information stored in the second memory indicating that the option ROM of the accessory cannot be successfully executed by the system BIOS (see the "Yes" branch from step 66), then the BSP will bypass step 68 and jump to step 70 directly, where the BSP would still set the flag for the accessory to a value of true indicating that the option ROM for the accessory should be skipped (i.e., BSP efforts to launch the option ROM are done). Whenever the API determines that the flag (BspDoneFlag) has been given a true value for a particular accessory, then the API will stop monitoring the execution of the option ROM for that accessory and proceed to step 88. After step 70, the BSP will continue the booting of the computing device, for example to initialize other components and then to load the operation system.

Note that if the computing device includes multiple accessories that each have an option ROM, then steps 66, 68 may be executed multiple times, once for each accessory in the computing device that contains an option ROM. For every accessory, the BSP will determine whether to execute the option ROM of the accessory based on the value of a respective flag for the particular accessory in the memory (i.e., information stored in NVRAM about the accessory). After all option ROMs in the computing device have been executed, then step 70 should be run. The BSP continues the system booting in step 72 only after all accessories that have an option ROM have been either successfully initialized or have been skipped as a result of the option ROM failing to execute.

The API 74 is, as mentioned above, a process executed by the AP independent of the BSP. Accordingly, even if the BSP hangs in step 68 during execution of an option ROM, the AP can still continue executing the API process 74 without being affected. When the BSP calls for the API 74 in step 62, the AP initially checks, in step 76, whether the flag in system memory, mentioned above, is set to the true value by the BSP (see the dashed line from step 70 to step 76), which would indicate that the option ROM of an accessory has been successfully executed or skipped. If the flag has been set to the true value (see the "Yes" branch from step 76), then the AP enters an idle state using the AP rendezvous function 88, in which the AP stops monitoring the execution of the option ROM since the option ROM has already been successfully executed. However, if in step 76 the AP finds that the flag has not been set to the true value (see "No" branch from step 76), then an AP watchdog timer is started and the AP will not take any recovering measures until the AP determines, in step 78, that a predetermined timeout (TO) period has elapsed. If the predetermined time has not elapsed (see the "No" branch from step 78), then the AP returns to step 76 and the steps 76, 78 may be repeated multiple times as the AP is waiting for the result of the BSP's execution of the option ROM. In other words, the AP polls for a true value of the flag for a predetermined period of time during the concurrent operations of both the BSP and the AP.

In step 78, if after the predetermined timeout period has passed and there is still no true value set for the flag (see the "Yes" branch from step 78), then the AP will intervene into the execution of the option ROM. Firstly, in step 80 the AP will store information about the accessory in the second memory, such as NVRAM, to indicate that the accessory has an option ROM that cannot be successfully executed within the given time. Such information may be utilized by the BSP later in step 66 as described above, such as during a subsequent booting process. Then, in step 82, the AP will recover the BSP to the execution environment by using the saved restore point in the system memory. The AP knows about the restore point and its location in the system memory since the BSP passed this information to the AP when the BSP saved the execution environment into the memory in step 64. Accordingly, in step 82 the API may instruct the BSP to return to the previously stored restore point (per step 64) and then again proceed to step 66. The purpose of recovering the BSP is to make sure that the BSP is in good order and is able to attempt to execute the option ROM again. Without the ability to recover the BSP, the BSP could become hung during its first attempt to execute the option ROM.

After the BSP has been recovered and has attempted to skip the bad option ROM and execute the other option ROMs on the computing device, the AP will check again if the flag is set to the true value in step 84. If yes, then similar to the successful determination in step 76, the AP enters an idle state using the AP rendezvous function 88, in which case the AP stops monitoring the execution of the option ROM since the option ROM has already been successfully executed. However, if the AP finds or determines in step 84 that the option ROM still cannot be executed successfully after a recovery of the BSP or that the BSP recovery has failed, and determines in step 85 that the AP watchdog timer has exceeded the timeout (TO) period, then, in step 86, the AP will report this information about the accessory to the IMM module or otherwise store the information about the accessory in second memory. The reported information about the accessory is saved in the second memory (perhaps in the form of a flag or bit indicating that the option ROM will not successfully execute) so that, after a reboot of the computing device, the information can be utilized by the BSP in step 60 as described above. After step 86, the AP then causes the system to reboot in step 90, with the information about the accessory safely saved in the second memory, such as NVRAM of the IMM module, where the information can be accessed by the BSP during the reboot process. The reboot of the computing device can be considered as another way of recovering the BSP since the status of the BSP will be reset during the reboot. As described herein, the system memory of the computing device may be referred to as a first memory, and the memory in the IMM module may be referred to as a second memory.

The embodiment described above therefore provides an improved tolerant option ROM dispatching method. If the computing device has a bad option ROM (i.e., an option ROM that is not compatible with the system BIOS and causes the BSP to hang) or if the computing device has a bad accessory (that is, the hardware of the accessory is damaged such that trying to execute its option ROM causes the BSP to hang), then the relevant option ROM is skipped during option ROM dispatching. Accordingly, the system BIOS, such as UEFI, will not hang even if a bad option ROM or bad accessory is present in the computing device. Rather, the computing device will automatically map-out the bad accessory, skip the option ROM execution, and continue the system booting automatically. Such a method improves the fault tolerance of the computing device in executing the option ROM of one or more accessories in the computing device, enhances the availability time of the computing device, and reduces the service support/cost for the computing device.

The exemplary embodiments of the present invention are thus fully described. Although the description referred to particular embodiments, it will be clear to one skilled in the art that embodiments may be practiced with variation of these specific details. Hence, the claims should not be construed as limited to the embodiments set forth herein.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon. The computer readable program code or program instructions may implement or initiate any one or more step of the methods described herein.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment. The terms "couple" and "connect" refers to coupling or connection either directly or indirectly via one or more other components or means unless otherwise stated.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. A computing device, comprising:
an accessory containing an option ROM;
a first processing unit adapted to boot the computing device and to execute the option ROM; and
a second processing unit adapted to be activated by the first processing unit to monitor execution of the option ROM by the first processing unit;
wherein the second processing unit is adapted to restore the first processing unit to a state prior to execution of the option ROM in response to the first processing unit becoming hung during execution of the option ROM.

2. The computing device of claim 1, wherein the first processing unit is further adapted to save an execution environment of the first processing unit into a first memory of the computing device before executing the option ROM.

3. The computing device to claim 2, wherein the first memory is a system memory of the computing device.

4. The computing device to claim 2, wherein the second processing unit is further adapted to store information about the accessory into a second memory of the computing device, wherein the information about the accessory indicates whether the option ROM of the accessory will execute successfully.

5. The computing device according to claim 4, wherein the second memory is non-volatile memory.

6. The computing device of claim 4, wherein the first processing unit is adapted to continue boot of the computing device after the first processing unit is restored to the state prior to execution of the option ROM by skipping the option ROM in response to the information stored in the second memory.

7. The computing device of claim 4, wherein the second memory is memory attached to an Integrated Management Module.

8. The computing device of claim 4, wherein the second processing unit is further adapted to initiate a reboot of the computing device after storing the information about the accessory into the second memory of the computing device.

9. The computing device of claim 8, wherein the first processing unit is further adapted to disable the accessory during the reboot of the computing device and before activating the second processing unit in response to the information about the accessory stored in the second memory indicating that the option ROM of the accessory will not execute successfully.

10. The computing device of claim 1, wherein the first and second processing units are first and second cores of a multicore microprocessor.

11. The computing device of claim 1, wherein the first processing unit is a boot strap processor, and wherein the second processing unit is an application processor.

12. A computer program product comprising non-transitory computer readable storage media having program instructions embodied therewith, the program instructions executable by a processor to:
monitor execution of an option ROM by a first processor of a computing device, wherein the option ROM is included in an accessory coupled to the computing device;
determine whether the first processor has become hung during execution of the option ROM; and
restore the first processor to an execution environment that the first processor had prior to execution of the option ROM.

13. The computer program product of claim 12, where the first processor is a boot strap processor.

14. The computer program product of claim 12, wherein the program instructions are further executable by the processor to:
store information about the accessory into a second memory of the computing device prior to restoring the first processor to the execution environment that the first processor had prior to execution of the option ROM.

15. The computer program product of claim 14, wherein the second memory is a non-volatile memory of the computing device.

16. The computer program product of claim 14, wherein the second memory is part of an Integrated Management Module.

17. The computer program product of claim 14, wherein the information about the accessory stored into the second memory instructs the first processor to skip execution of the option ROM.

18. The computer program product of claim 17, wherein the program instructions are further executable by the processor to:

initiate a reboot of the computing device.

\* \* \* \* \*